United States Patent
Tabuchi et al.

(10) Patent No.: US 11,021,578 B2
(45) Date of Patent: *Jun. 1, 2021

(54) GEL COMPOSITION AND PRODUCTION METHOD THEREFOR

(71) Applicant: DSP Gokyo Food & Chemical Co., Ltd., Osaka (JP)

(72) Inventors: Akira Tabuchi, Osaka (JP); Hiroshi Egawa, Osaka (JP)

(73) Assignee: DSP Gokyo Food & Chemicals Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/311,408

(22) PCT Filed: Jun. 24, 2016

(86) PCT No.: PCT/JP2016/068891
§ 371 (c)(1),
(2) Date: Dec. 19, 2018

(87) PCT Pub. No.: WO2017/221416
PCT Pub. Date: Dec. 28, 2017

(65) Prior Publication Data
US 2019/0338081 A1    Nov. 7, 2019

(51) Int. Cl.
*C08J 3/075*    (2006.01)
*C08B 37/00*    (2006.01)

(52) U.S. Cl.
CPC ........... *C08J 3/075* (2013.01); *C08B 37/0087* (2013.01)

(58) Field of Classification Search
CPC .......... C08J 3/075; C08J 3/20; C08B 37/0087
See application file for complete search history.

(56) References Cited

U.S. PATENT DOCUMENTS 6,245,354 B1 * 6/2001 Miyazaki ................. A61K 9/02
424/400
8,501,210 B2   8/2013 Fujiwawa et al.

FOREIGN PATENT DOCUMENTS

| | | |
|---|---|---|
| EP | 2008643 A1 | 12/2008 |
| JP | 06181704 A | 7/1994 |
| JP | 08283305 A | 10/1996 |
| JP | 09248143 A | 9/1997 |
| JP | 10167951 A | 6/1998 |
| JP | 11332474 A | 12/1999 |
| JP | 2000354460 A | 12/2000 |
| JP | 2001252032 A | 9/2001 |
| JP | 2004180549 A | 7/2004 |
| JP | 2004201606 A | 7/2004 |
| JP | 2007238538 A | 9/2007 |
| JP | 2009060794 A | 3/2009 |
| JP | 2012012328 A | 1/2012 |
| JP | 2016121279 A | 7/2016 |
| WO | 9729777 A1 | 8/1997 |
| WO | 0044242 A1 | 8/2000 |
| WO | 2007136083 A1 | 10/2009 |

OTHER PUBLICATIONS

Ravachol, J., et al., "Mechanism involved in xyloglucan catabolism by the cellulosome-producing bacterium Ruminiclostridium cellulolyticum," Mar. 7, 2016, pp. 1-17, vol. 6, No. 1, XP055476503, Scientific Reports.
Extended European Search Report for European Application No. 16 906 332.8, dated Dec. 4, 2019, 12 pages.
International Preliminary Report on Patentability and Written Opinion for International Application No. PCT/JP2016/068890, dated Dec. 25, 2018, with translation, 10 pages.
USPTO Non Final Office Action issued in U.S. Appl. No. 16/311,385, dated Nov. 29, 2019, 17 pages.
Extended European Search Report for European Application No. 16 906 333.6, dated Jan. 14, 2020, 10 pages.
International Preliminary Report on Patentability and Written Opinion for International Application No. PCT/JP2016/068891, dated Dec. 25, 2018, with translation—11 pages.
International Search Report issued in PCT/JP2016/068891, dated Aug. 2, 2016, 5 pages.
USPTO Notice of Allowance for U.S. Appl. No. 16/311,385, dated Apr. 30, 2020, 8 pages.
USPTO Notice of Allowance issued in U.S. Appl. No. 16/311,385, dated Mar. 4, 2020, 16 pages.

* cited by examiner

*Primary Examiner* — Pancham Bakshi
(74) *Attorney, Agent, or Firm* — RatnerPrestia

(57) ABSTRACT

Provided is a production method for a gel composition including steps (1) to (3) mentioned below: step (1) of mixing at room temperature a partial degradation product of the galactose moiety of galactoxyloglucan and an aqueous solvent to obtain a mixture; step (2) of cooling or freezing the mixture obtained in step (1); and step (3) of gelling the mixture cooled or frozen in step (2) by heating to obtain a gel composition that includes the galactose-partial degradation product.

6 Claims, 1 Drawing Sheet

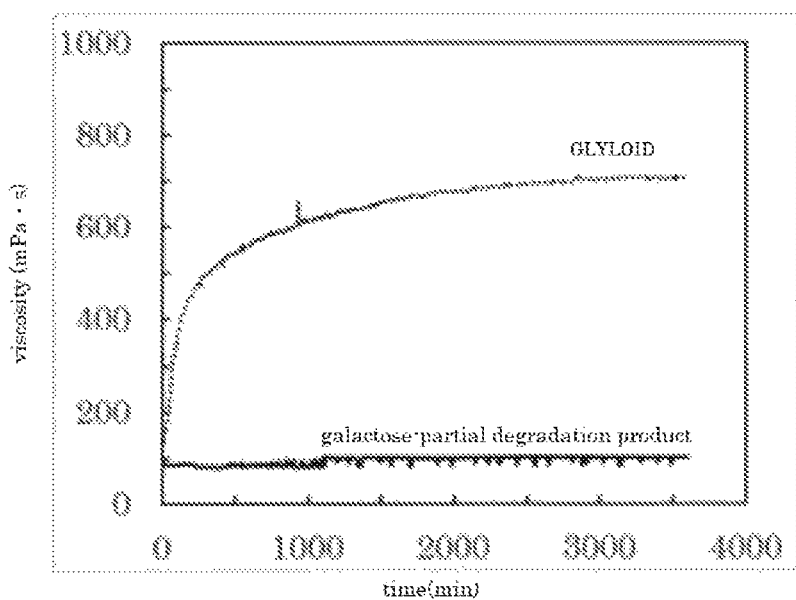

GEL COMPOSITION AND PRODUCTION METHOD THEREFOR

CROSS REFERENCE TO RELATED APPLICATION

This application is the U.S. National Phase Application of PCT/JP2016/068891, filed Jun. 24, 2016, the contents of such application being incorporated by reference herein.

FIELD

The present invention relates to a gel composition and production method therefor.

BACKGROUND

Conventionally, galactoxyloglucan is known as a natural polysaccharide. Galactoxyloglucan includes glucose, xylose, and galactose as constituent sugars, a main chain of which has β-1,4-bonded glucose, and a side chain of which has xylose and galactose bonded to the xylose. Galactoxyloglucan itself is not usually gelled, while being gelled in the presence of saccharide, ion, or alcohol.

Meanwhile, there has been proposed a partial degradation product of the galactose moiety of galactoxyloglucan, which is obtained by partially degrading (partial degradation) to remove a galactose moiety constituting a part of the side chain of galactoxyloglucan using refined β-galactosidase derived from microorganisms (hereinafter also referred to simply as "galactose-partial degradation product") (see Patent Literatures 1 and 2). When galactose-partial degradation product is mixed with an aqueous solvent, a mixture thereof shows a thermal behavior having a reversed relationship with the thermal behavior of the galactoxyloglucan. Specifically, the galactose-partial degradation product is gelled when heated and solated when cooled so that it shows a thermal behavior in this sol/gel change is reversible. Such a thermal behavior is called reverse thermal gelation characteristics. The galactose-partial degradation product is derived from natural polysaccharides and is not subjected to chemical modification (addition), and therefore is harmless to humans and the environment. Therefore, gel compositions produced using the galactose-partial degradation product can be widely used in foods, cosmetics, pharmaceutical formulations and the like. There have been proposed, as a production method for a gel composition including a galactose-partial degradation product of this kind, a method for producing a gel composition by mixing a cooled aqueous solvent with a galactose-partial degradation product to allow the galactose-partial degradation product to dissolve in the aqueous solvent, and gelling the dissolved solution by heating (see Patent Literatures 1 and 2).

CITATION LIST

Patent Literature

Patent Literature 1: JP 118-283305
Patent Literature 2: International Publication WO97/29777

SUMMARY

Technical Problem

In general, it is said that an aqueous solvent is preferably mixed with polysaccharides in order to prevent formation of undissolved lumps at the time of contact of the aqueous solvent with the polysaccharides, in order to easily produce a gel composition including polysaccharides. This is because a powdery solid matter (nonhydrate product) resulting from nonhydrated polysaccharides remains in the produced gel composition, which causes deterioration in quality. Also, a long time and much labor are needed to dissolve polysaccharides which have become undissolved lumps by completely hydrating deep inside the polysaccharides.

In this regard, according to the methods of Patent Literatures 1 and 2, a method employed is that, when producing a gel composition using a galactose-partial degradation product, the galactose-partial degradation product is mixed with a cooled aqueous solvent to allow themselves to be dissolved. However, these methods necessitate cooling an aqueous solvent followed by mixing of the galactose-partial degradation product, which takes a lot of time and labor for preparation. These methods also cause excessive viscosity of the mixture, which may cause difficulty in handling when it is transferred to a desirable container and is gelled by heating. Also, these methods may cause a difficulty in filling a desirable container with a sufficient amount of the mixture or cause air bubbles to be easily entrained in the mixture during preparation or filling of a solution. Thus, it is hard to say that a gel composition can be easily produced by these methods of Patent Literatures 1 and 2.

In view of the above circumstances, it is an object of the present invention to provide a production method that is capable of easily producing the gel composition including a partial degradation product of the galactose moiety of galactoxyloglucan, and a gel composition produced by the production method.

Solution to Problem

In order to achieve the aforementioned object, the inventors of the subject application have diligently studied as mentioned below. It is generally known that, when a polysaccharide is mixed with an aqueous solvent, water in the aqueous solvent causes the polysaccharide to first hydrate and swell, and when the hydration and swelling further proceeds, the polysaccharide dissolves. As a result of taking into account this fact and the methods of Patent Literatures 1 and 2, it has been found that, since the methods of Patent Literatures 1 and 2 include a step of dissolving a galactose-partial degradation product by being mixed with a cooled aqueous solvent, the dissolved solution has a relatively high viscosity, which results in difficulty in handling of the dissolved solution. Also, as the temperature of the aqueous solvent is lowered by cooling, the time required for the galactose-partial degradation product to come into the hydration and swollen state, further the time required for it to convert from the hydration and swollen state into the dissolved state are shortened. Because of this, it was found that, in the methods of Patent Literatures 1 and 2, viscosity develops at an early stage, and therefore, the dissolved solution must be forcibly stirred with a relatively strong force in order to homogeneously disperse the galactose-partial degradation product in the aqueous solvent. As a result of the diligent studies based on these findings, the inventors of the subject application have found that, by mixing the aqueous solvent and the galactose-partial degradation product at room temperature, the galactose-partial degradation product can be dispersed in an aqueous solvent without occurrence of undissolved lumps in a mixture. Such mixing at room temperature causes the galactose-partial degradation product to be easily brought into a state where it is almost undissolved in the aqueous solvent, which results in producing a mixture having a low viscosity. Further, cooling or freezing the mixture having such a low viscosity causes the galactose-partial degradation product to be easily brought into a state where it is not dissolved but is easy to hydrate and swell in a high viscous state, which results in producing a mixture having a high viscosity. Further, there is no need to cool the aqueous solvent in advance, by which time and labor for it is eliminated. It has also been found that, even if a mixture with the galactose-partial degradation product almost hydrated and swelled therein is heated, the mixture can be gelled and hence a gel composition can be produced. Thus, the present invention have been achieved.

Specifically, according to the present invention, there is provided a production method for a gel composition, including steps (1) to (3) mentioned below:

step (1) of mixing at room temperature a partial degradation product of the galactose moiety of galactoxyloglucan and an aqueous solvent to obtain a mixture;

step (2) of cooling or freezing the mixture obtained in step (1); and step (3) of gelling the mixture cooled or frozen in step (2) by heating to obtain a gel composition that includes the galactose-partial degradation product.

The "room temperature" herein means a temperature within a range of from 15 to 35° C. "Mixing at room temperature" means mixing with the aqueous solvent being at room temperature. The state "cooled" means a state where the mixture of the aqueous solvent and the galactose-partial degradation product is not solidified by lowering the temperature, and also means the state where liquefied portions and solidified portions (i.e., frozen portions) are both present. The state "frozen" means a state where the mixture of the aqueous solvent and the galactose-partial degradation product is solidified by lowering the temperature.

Meanwhile, in the present description, the "dispersed" state of the galactose-partial degradation product means a state where, while the aqueous solvent penetrates galactose-partial degradation product which is entirely in powder form, it is present in the aqueous solvent with little formation of a highly viscous (adhesive) layer on the surface layer. The state "hydrated and swollen" means a state where the galactose-partial degradation product which is entirely in powder form fully absorbs the aqueous solvent, and the galactose-partial degradation product as a whole is kept in a highly viscous state. The state "dissolved" means a state where polysaccharide molecule chains are detached from the highly viscous surface layer and disperse from the surface layer into the solvent. The state "undissolved lumps" means a state where the galactose-partial degradation product in powder form as a whole is lumped or such undissolved lumps are further form a group, resulting from that the galactose-partial degradation product in powder form which is in aggregated form (forming a aggregated product) comes into contact with water, allowing only the outer layer of the aggregated product having an air layer contained therein to form a highly viscous state by the contact with water, and thereby making the aqueous solvent less penetrate the inside of the aggregated product.

In step (1) of the production method for the gel composition having the above construction, the galactose-partial degradation product and the aqueous solvent are preferably mixed at 18 to 30° C.

In step (1) of the production method for the gel composition having the above construction, 30 to 55% of the galactose moiety is preferably degraded in the galactose-partial degradation product.

In step (2) of the production method for the gel composition having the above construction, the mixture obtained in step (1) is preferably cooled or frozen to −25 to 10° C.

In step (1) of the production method for the gel composition having the above construction, 0.05 to 20 mass % of the galactose-partial degradation product is preferably included in the mixture.

In the production method for the gel composition having the above construction, the aqueous solvent preferably includes water or salt aqueous solution.

The gel composition according to the present invention includes a partial degradation product of the galactose moiety of galactoxyloglucan obtained by the aforementioned production method for the gel composition.

BRIEF DESCRIPTION OF DRAWINGS

The FIGURE is a graph showing a relationship between time and viscosity after a galactose-partial degradation product is dispersed in water at room temperature.

DESCRIPTION OF EMBODIMENTS

Hereinafter, embodiments of a production method for a gel composition and a gel composition produced by the production method according to the present invention will be described.

A production method for the gel composition of this embodiment includes steps (1) to (3) mentioned below:

step (1) of mixing at room temperature a partial degradation product of the galactose moiety of galactoxyloglucan and an aqueous solvent to obtain a mixture;

step (2) of cooling or freezing the mixture obtained in step (1); and step (3) of gelling the mixture cooled or frozen in step (2) by heating to obtain a gel composition that includes the galactose-partial degradation product.

The partial degradation product of the galactose moiety of galactoxyloglucan used for the production method of this embodiment means a substance, which is obtained by partially dissolving to remove the galactose moiety on the side chain of galactoxyloglucan, and the partial degradation product of the galactose moiety of galactoxyloglucan hereinafter may be abbreviated as the galactose-partial degradation product. Galactoxyloglucan means galactoxyloglucan (complete galactoxyloglucan) of which the galactose moiety on the side chain is not removed by partial degradation with later-described enzyme treatment. This complete galactoxyloglucan may also be referred to as native galactoxyloglucan.

Galactoxyloglucan is a constituent of a cell wall (a primary wall) of a higher plant such as dicotyledon and monocotyledon, and exists as a storage polysaccharide of some plant seeds. Galactoxyloglucan includes glucose, xylose, and galactose as constituent sugars, a main chain of which has β-1,4-bonded glucose, and a side chain of which has xylose and galactose bonded to the xylose. Galactoxyloglucan itself is not usually gelled, while being gelled in the presence of saccharide, ion, or alcohol.

Galactoxyloglucan may be galactoxyloglucan derived from any plants and obtainable from, for example, seeds of tamarind, jatoba, and nasturtium, cereal such as soybean, mung bean, kidney bean, rice, and barley, or skin of fruits such as apple. A preferable one is galactoxyloglucan derived from leguminous-plants tamarind seed because of the easiest availability and the large content of galactoxyloglucan. A commercially available one can be employed as such galactoxyloglucan.

The galactose-partial degradation product used for the production method of this embodiment is produced by the following production methods, for example. Specifically, the galactoxyloglucan derived from tamarind seed is maintained at 55° C. and then adjusted to pH 6 with trisodium citrate, followed by addition of β-galactosidase thereto, to react at 50 to 55° C. for 16 hours, while being stirred. Subsequently, after the enzyme is deactivated by heating at 95° C. for 30 minutes, the obtained product is returned to room temperature, followed by addition of an equal volume of ethanol thereto, to be left standing for 1 hour. Precipitates which were obtained after being left standing are collected by way of suction filtration and dried with a ventilation drier, and thereafter the precipitates are pulverized to thereby produce a galactose-partial degradation product.

β-galactosidase to be used may be any product derived from plants or microorganisms, but a preferable one is enzyme derived from microorganisms such as Aspergillus oryzae and Bacillus circulans, or enzyme present in a galactoxyloglucan-containing seed. A commercially available one can be employed as such a β-galactosidase.

In the enzyme reaction with this β-galactosidase, the galactose moiety on the side chain of the galactoxyloglucan is partially removed with the progress of reaction, and when the galactose removal ratio reaches about 30%, the reaction solution is rapidly thickened in viscosity and gelled. When the galactose removal ratio is in the range of 30 to 55%, the galactose-partial degradation product has reverse thermal gelation characteristics, whereby it is gelled when heated and solated when cooled. The galactose-partial degradation product tends to be not gelled with the galactose removal ratio of less than 30%, while galactose-partial degradation product tends to form an excessively hard gel with the removal ratio over 55% (see JP 118-283305 and International Publication WO97/29777).

In consideration of this, it is preferable to use the aforementioned galactose-partial degradation product in which 30 to 55% of a galactose moiety is degraded. By setting the removal ratio within this range, it is possible to produce a gel composition that is not excessively hard, while allowing it to exhibit sufficient gelation characteristics by heating. This makes it easier to allow the galactose-partial degradation product to exhibit the reverse thermal gelation characteristics whereby it is fully gelled when heated and fully solated when cooled in a reversible manner.

The aforementioned galactose-partial degradation product in which 30 to 55% of a galactose moiety is degraded is produced from galactoxyloglucan in which 30 to 55% of a galactose moiety is degraded as mentioned above. Galactoxyloglucan usually includes about 37% of a side-chain xylose and about 17% of a side-chain galactose (see Gidley, et al., Carbohydrate Research), 214 (1991), pp. 219-314). Therefore, it is calculated that the galactose-partial degradation product in which 30 to 55% of a galactose moiety is degraded includes 39 to 41% of a side-chain xylose and 8 to 12% of a side-chain galactose. The ratio of degradation of a galactose moiety (that is, the galactose removal ratio) can be calculated by measuring an amount of galactoxyloglucan oligosaccharides generated by cellulase degradation of the obtained partial degradation product with high performance liquid chromatography (HPLC) (amino column).

In step (1) in the production method for this embodiment, the galactose-partial degradation product and the aqueous solvent are mixed at room temperature to thereby obtain a mixture thereof. More specifically, a dispersion liquid (i.e., suspension liquid) as a mixture in which the galactose-partial degradation product has been dispersed in the aqueous solvent can be obtained by mixing the galactose-partial degradation product with the aqueous solvent at room temperature.

As mentioned above, as the temperature of the aqueous solvent is lowered by cooling, the time required for the galactose-partial degradation product to reach the hydration and swollen state and the time required for the galactose-partial degradation product to be transformed from the hydration and swollen state into the dissolved state are shortened. In such a state where the time required for the galactose-partial degradation product to reach the dissolved state is relatively short, a relatively strong stirring force is required in order to disperse the galactose-partial degradation product in the aqueous solvent as homogeneously as possible. That is, a relatively strong stirring force is required in order to dissolve the galactose-partial degradation product in the cooled aqueous solvent as homogeneously as possible.

On the other hand, the time required for the galactose-partial degradation product to reach the hydration and swollen state in the aqueous solvent at room temperature and the time required for the galactose-partial degradation product to reach the dissolved state are much longer than those in the case of using the cooled aqueous solvent, and therefore, the galactose-partial degradation product hardly dissolves even when the stirring is performed with the same force as that mentioned above. Accordingly, the occurrence of undissolved lumps caused by the galactose-partial degradation product can be suppressed by mixing the galactose-partial degradation product with the aqueous solvent at room temperature in step (1).

A gathered powder seems to occur in a dispersion liquid during mixing of the galactose-partial degradation product with an aqueous solvent. However, this is not an undissolved lump and therefore the galactose-partial degradation product can be easily dispersed almost completely by lightly crumbling the gathering with spatula (spatel) or the like. The operation of "crumbling" herein means bringing a gathered substance back to the form or unit before it is gathered, and means an operation entirely different from stirring to be carried out generally for dissolving a substance.

The temperature of the aqueous solvent during mixing the aqueous solvent and the galactose-partial degradation product is not particularly limited, provided that it is at room temperature, but the temperature to be employed is preferably 18 to 30° C., more preferably 18 to 28° C. By mixing at 18° C. or higher, it is possible to disperse the galactose-partial degradation product in the aqueous solvent, while further avoiding occurrence of undissolved lumps. Thereby, it is possible to further suppress increase in viscosity caused, for example, when the galactose-partial degradation product has been dissolved. Thus, it is possible to suppress deterioration of workability. Further, as a result of the mixing at 30° C. or lower, the galactose-partial degradation product can be dispersed in the aqueous solvent under the ordinary environment at room temperature without need for special conditions such as heating, thereby enabling these steps to be performed by a simple operation. The aforementioned mixing may be performed while the heating is performed. Thus, it is possible to suppress deterioration of workability by mixing the galactose-partial degradation product and the aqueous solvent at 18 to 30° C.

The time for mixing the aqueous solvent with the galactose-partial degradation product is not particularly limited and may be appropriately set when considering that the galactose-partial degradation product has a very good affinity to the aqueous solvent at the aforementioned temperature. The mixing time to be employed is, for example, 5 minutes to 1 hour, and preferably 10 minutes to 30 minutes. Setting the mixing time at 1 hour or less is advantageous in that the operation can be finished earlier and the workability can be improved.

The content of the galactose-partial degradation product in the aqueous solvent is not particularly limited and may be appropriately set. For example, the content may be suitably set according to the desired gel characteristics of the gel composition to be obtained. In view of this aspect, the content of the galactose-partial degradation product in the mixture is preferably 0.05 to 20 mass %, more preferably 1 to 10 mass %, still more preferably 3 to 10 mass %, and further preferably 3 to 5 mass %, for example. With the content of the galactose-partial degradation product of 0.05 mass % or more in the mixture, it is possible to more securely gel the mixture. Further, the galactose-partial degradation product content of 3 mass % or more is preferable when considering that a water layer may be not easily formed on the surface of the gel. Meanwhile, with the content of galactose-partial degradation product of 20 mass % or less, it is possible to allow a moderate amount of water to be retained in the gel so that a gel composition capable of exhibiting desired gel characteristics can be produced. Further, a gel composition capable of further exhibiting desired gel characteristics can be produced by mixing together the respective components of the mixture within a shallow (small depth) container (that is, in a state where the depth of the mixture is made small). When the concentration of the galactose-partial degradation product is low, water that could not contribute to gelation may form a layer on the upper side of the gel composition and the rest below it may form a gelled layer by heating the later-described cooled or frozen mixture. In this case, it is also possible to obtain the gel layer below the water layer (separated water) as a gel composition by removing the water layer (separated water) on the upper side. That is, it is possible to produce a gel composition by concentration of the later-described cooled or frozen mixture. When considering that the water layer is thus removed depending on the concentration of the galactose-partial degradation product, the concentration of the galactose-partial degradation product in the produced gel composition (when the water layer is removed, the gel composition after the removal, and when the water layer does not occur, the gel composition as produced) is preferably 1 to 20 weight %, more preferably 1 to 10 weight %, and still more preferably 2 to 5 weight %.

The aqueous solvent is not particularly limited provided that it is a solvent containing water; however, water, salt aqueous solution, and the like can be mentioned, for example. As the salt aqueous solution, sodium salt aqueous solution, calcium salt aqueous solution, buffer solution, and the like can be mentioned. As the buffer solution, a phosphate buffer solution, a citrate buffer solution, and the like of pH 4 to 7 can be mentioned.

According to step (1), it is also possible to obtain the gel composition as a molded article formed into a desired shape by transferring the mixture to a mold or the like having a desired shape before cooling or freezing in step (2).

In step (2), the mixture obtained in step (1) is cooled or frozen. More specifically, a hydrated swollen product in which the galactose-partial degradation product is hydrated and swollen in the aqueous solvent is obtained by cooling or freezing the dispersion liquid obtained in step (1). Examples of the hydrated swollen product include a hydrated swollen product in liquid form that has been cooled but not frozen and a hydrated swollen product in solid form that has been frozen. In step (2), the aqueous solvent may include a dissolved product resulting from partial dissolving of the galactose-partial degradation product.

According to step (2), the galactose-partial degradation product dispersed in the aqueous solvent in step (1) can be hydrated and swollen with water in the aqueous solvent by cooling or freezing the mixture of the aqueous solvent and the galactose-partial degradation product. Since hydration and swelling can be thus produced, the development of viscosity can be relatively delayed, and thereby the galactose-partial degradation product can be dispersed in the aqueous solvent without need for forcible stirring with a relatively strong force as conventionally needed. Thus, the production method is simplified because the need for forcible stirring can be eliminated. In step (2), forcible stirring is not necessarily eliminated, but when forcible stirring is performed, the hydration and swelling of the galactose-partial degradation product can be more quickly produced than in the case of skipping the forcible stirring.

In the cooling or the freezing, the degree by which the temperature of the mixture is to be lowered is not particularly limited and may be appropriately set, provided that the galactose-partial degradation product in the mixture (dispersion liquid) obtained in step (1) can be hydrated and swollen. As the degree by which the temperature of the mixture is lowered is greater, the galactose-partial degradation product tends to be more easily hydrated and swollen, but on the other hand, the hydration and swelling tends to excessively progress to thereby cause the viscosity to be easily developed. In view of this aspect, it is preferable to cool or freeze the mixture obtained in step (1) to −25 to 10° C., for example. When the upper limit of the range of temperature, to which the temperature of the mixture is lowered, is set at 10° C. or lower, the galactose-partial degradation product is easily hydrated and swollen. The upper limit is more preferably 5° C. or lower, still more preferably 1° C. or lower when considering that the hydration and swelling of the galactose-partial degradation product can be produced at such a temperature. On the other hand, when the lower limit of the range of temperature to which the temperature of the mixture is lowered is set at −25° C., excessive progress of hydration and swelling is suppressed, thereby making it hard for the viscosity to develop.

In step (3), the gel composition including the galactose-partial degradation product can be obtained by heating the mixture cooled or frozen in step (2), thereby gelling the same. More specifically, in step (3), the gel composition including the galactose-partial degradation product is obtained by heating the hydrated swollen product obtained in step (2), thereby gelling the same.

In the heating, the degree by which the temperature of the cooled or frozen mixture (hydrated swollen product) obtained in step (2) is to be raised is not particularly limited and may be appropriately set, provided that the mixture is raised to a temperature at which the mixture can be fully gelled. As the degree by which the temperature of the mixture is raised is greater, the gel strength can be increased, but on the other hand, unnecessary heating operation is increased and hence the workability tends to be deteriorated. In view of this aspect, it is preferable to raise the temperature of the cooled or frozen mixture to 25 to 60° C., for example. The gel strength can be sufficiently increased by setting the lower limit of the range of temperature, to which the temperature of mixture is raised, at 25° C. The lower limit is more preferably 40° C. or higher when considering that the gel strength can be more sufficiently increased. Meanwhile, when the upper limit of the range of temperature, to which the temperature of mixture is raised, is 60° C. or lower, unnecessary heating operation can be suppressed and hence the workability is suppressed from being deteriorated. The upper limit is still more preferably 50° C. or lower from the aspect of suppressing unnecessary heating operations.

The gel composition of this embodiment is a gel composition including a galactose-partial degradation product obtained by the production method of this embodiment. The gel composition of this embodiment preferably has heat resistance and water resistance.

As mentioned above, the production method for the gel composition of this embodiment includes steps (1) to (3) mentioned below:

step (1) of mixing at room temperature a partial degradation product of the galactose moiety of galactoxyloglucan and an aqueous solvent to obtain a mixture;

step (2) of cooling or freezing the mixture obtained in step (1); and step (3) of gelling the mixture cooled or frozen in step (2) by heating to obtain a gel composition that includes the galactose-partial degradation product.

With the production method for the gel composition of this embodiment, in step (1), the partial degradation product of the galactose moiety of galactoxyloglucan is mixed with the aqueous solvent at room temperature so that the galactose-partial degradation product can be dispersed in the aqueous solvent without occurrence of undissolved lumps in the mixture. In step (2), the mixture obtained in step (1) is cooled or frozen, and thereby the galactose-partial degradation product can be hydrated and swollen in the aqueous solvent. At this time, it is possible to easily bring the galactose-partial degradation product into not the dissolved state but the hydrated swollen state. Thereby, it is possible to lower the viscosity of the mixture and allow the mixture to be a hydrated swollen product having high viscosity by cooling or freezing the mixture. Further, since the development of viscosity can be relatively delayed, the galactose-partial degradation product can be fully dispersed in the aqueous solvent without need for forcible stirring with a relatively strong force as conventionally needed. Moreover, with steps (1) and (2), it is not necessary to cool the aqueous solvent in advance, and therefore time and labor for preparation can be eliminated. Then, in step (3), the mixture cooled or frozen in step (2) can be gelled by heating to produce a gelled mixture. The gel composition obtained this time is suppressed from having non-hydrated products such as undissolved lumps, which are caused by the galactose-partial degradation product, mixed therein. In step (3), when the cooled mixture is heated, it is preferable that the mixture be thawed by heating, then forcibly stirred, and then heated, and alternatively, it is preferable that the mixture be heated while being forcibly stirred after it is thawed by heating. Thus, a more homogeneous gel composition is obtainable by forcibly stirring while heating. Such forcible stirring is preferable particularly in step (3) for the galactose-partial degradation product having such a low concentration in which an aqueous layer is formed, and the gel composition can be more homogenized by being subjected to the forcible stirring. Accordingly, the method including steps (1) to (3) enables to easily produce the gel composition including the galactose-partial degradation product.

When an attempt is made to disperse a polysaccharide such as a locust bean gum in an aqueous solvent at room temperature, undissolved lumps may occur, which causes a lot of time or the necessity for heating to eliminate the undissolved lumps. Therefore, the polysaccharide needs to be dispersed by, for example, being forcibly stirred or heated after introduction into the aqueous solvent. After the dispersion, the mixture must be gelled by freezing and further thawing. However, if the heating is continued after the thawing, gel transfers to sol, and hence gel dissolves. On the other hand, the galactose-partial degradation product is not solated even if it is continuously heated after cooling, as mentioned above.

The galactose-partial degradation product used for the production method of this embodiment has reverse thermal gelation characteristics, as mentioned above, and specifically, has characteristics where it is gelled by heating around the body temperature. Thus, in the production method of this embodiment, the mixture (hydrated swollen product at a comparatively low temperature) obtained in step (2) may be applied to the skin to carry out the gelation in step (3) through the body temperature, for example. That is, the gel composition may be prepared when needed. The mixture (hydrated swollen product) after cooling or freezing in step (1) may be allowed to stand still for storage at a low temperature of 15° C. or lower until it is used in step (3) as needed. The thus stored mixture may be moved to a mold having a desired shape before heating in step (3), and then subjected to step (3) in this state to thereby obtain a gel composition as a molded article.

In step (1) of the production method for the gel composition of this embodiment, the galactose-partial degradation product and the aqueous solvent are preferably mixed together at 18 to 30° C.

With such construction, the galactose-partial degradation product can be dispersed in the aqueous solvent in ordinary room-temperature environments, while further avoiding occurrence of undissolved lumps by mixing together the galactose-partial degradation product and the aqueous solvent at 18 to 30° C. Thus, it is possible to suppress deterioration of workability.

In step (1) of the production method for the gel composition of this embodiment, 30 to 55% of a galactose moiety is preferably degraded in the galactose-partial degradation product.

With such construction, by using the aforementioned galactose-partial degradation product in which 30 to 55% of the galactose moiety is degraded, it is possible to produce a gel composition that is not excessively hard, while allowing it to exhibit sufficient gelation characteristics by heating.

In step (2) of the production method for the gel composition of this embodiment, the mixture obtained in step (1) is preferably cooled or frozen to −25 to 10° C.

With such construction, by cooling or freezing the mixture to −25 to 10° C., the galactose-partial degradation product is easily hydrated and swollen, and excessive progress of hydration and swelling is suppressed.

In step (1) of the production method for the gel composition of this embodiment, 0.05 to 20 mass % of the galactose-partial degradation product is preferably mixed in the mixture.

With such construction, it is possible to allow the mixture to be surely gelled and allow a moderate amount of water to be retained in the gel, thereby enabling to produce a gel composition capable of exhibiting desired gel characteristics, when the content of the galactose-partial degradation product is 0.05 to 20 mass %.

In the production method for the gel composition of this embodiment, the aqueous solvent preferably includes water or salt aqueous solution.

The gel composition of this embodiment includes a partial degradation product of the galactose moiety of galactoxyloglucan obtained by the aforementioned production method for the gel composition.

As mentioned above, according to these embodiments, there are provided a production method that can relatively easily produce a gel composition including a partial degradation product of the galactose moiety of galactoxyloglucan, and a gel composition produced by this production method.

Since the gel composition obtained by the production method of these embodiments has characteristics where it is produced by being gelled by heating, it is usable as a polymer material in various industries, such as those for domestic purposes, medical field, biomaterials, cosmetics and hence usable in various fields. The galactose-partial degradation product used in these embodiments is not obtained by chemical modification of a natural substance derived galactoxyloglucan, and thus the obtained gel composition is also harmless to the living body.

The description for the gel composition and the production method therefor according to the embodiments was thus made, but the present invention is not limited to the aforementioned embodiments, and various modifications can be appropriately made within the intended scope of the present invention. In the gel composition and the production method therefor, additives other than the galactose-partial degradation product and the aqueous solvent may be appropriately added, for example.

EXAMPLES

The present invention will be hereinafter described in detail with reference to examples but the present invention is not limited to those examples.

(Production Example 1) Production of a Partial Degradation Product of the Galactose Moiety of Galactoxyloglucan Purification of β-galactosidase A 2.5% aqueous solution of a commercially available β-galactosidase having complex enzyme activity "LACTASE Y-AO" [derived from Aspergillus oryzae, manufactured by Yakult Pharmaceutical Industry Co., Ltd.] was subjected to 0 to 0.6 M NaCl gradient with 0.025 M phosphate buffer (pH 7.4) of an ion exchange chromatography [DEAE Toyopeal, manufactured by Tosoh Corporation] to obtain eluate at a NaCl concentration of 0.2 to 0.4 M. Furthermore, the obtained eluate was subjected to 0 to 0.6 M ammonium sulfate gradient with 0.025 M phosphate buffer (pH 7.4) of a hydrophobic chromatography [Butyl-Toyopeal, manufactured by Tosoh Corporation] to obtain eluate at an ammonium sulfate concentration of 10% or less. 60 mg of the purified enzyme was obtained from 2.5 g of a commercially available crude enzyme by these operations. Cellulase activity and IPase (isoprimeverose generation enzyme) activity were not found in this product.

Production of a Galactose-Partial Degradation Product

Using the purified enzyme β-galactosidase obtained above, an aqueous solution of 1% substrate galactoxyloglucan [GLYLOID (registered trademark), manufactured by DSP GOKYO FOOD & CHEMICAL Co., Ltd.] was reacted at an enzyme concentration of $2.4 \times 10^{-5}$ mass %, a pH of 5.6, and a temperature of 50° C., and thereafter heated at 100° C. for 20 minutes to stop the reaction. The obtained reaction solution was gelled in about 15 hours after the reaction start, and, as a result, a gelled composition was obtained. The galactose removal ratio in the obtained gelled composition was calculated by the method below. 1 mL of a solution with 0.15 mass % of Cellulase Onozuka RS [manufactured by Yakult Pharmaceutical Industry Co., Ltd.] (50 mM acetic acid buffer solution, a pH of 4.0) was added to 7 g of an aqueous solution with 1 mass % of the gelled composition to react at 50° C. overnight. An aqueous solution with 1 mass % of galactoxyloglucan was also made to react in the same manner and an obtained product was employed as a control. After the reaction, the enzyme was deactivated by heating the reaction liquid for 30 minutes at 98° C. Then, a sample was subjected to a pretreatment cartridge [IC-SP, manufactured by Tosoh Corporation] and a membrane filter of 0.45 μm cellulose acetate to obtain filtrate. 10 μL of the obtained filtrate was applied to an amino column of HPLC, in which acetonitrile:water=60:40 (v/v) was made to flow at 0.6 mL/min, so that elution areas of oligosaccharides (heptasaccharide (0 galactosemoiety), octasaccharide (1 galactose moiety), nonasaccharide (2 galactose moieties)) of galactoxyloglucan were detected using a refractive-index meter equipped therein. Then, the amount of galactose per unit (heptasaccharide) was calculated by an expression (area of octasaccharide+(area of nonasaccharide×2)/(area of heptasaccharide+area of octasaccharide+area of nonasaccharide). When the decreasing ratio of the amount of galactose determined on the gel composition from the amount of the galactose calculated from the control galactoxyloglucan was designated as the galactose removal ratio (%) and calculation was further made, the galactose removal ratio was found to be about 45%. Then, the thus obtained gelled composition was subjected to freeze dehydration, or was subjected to sedimentation and filtering subsequent to the addition of alcohol to the gelled composition, followed by drying, to obtain a galactose-partial degradation product in powder form.

In the following experimental examples, a product produced by heating after cooling or freezing the dispersion liquid in which the galactose-partial degradation product has been dispersed in water at room temperature was served as Example, and a product produced by heating an aqueous solution (dissolved solution), in which the galactose-partial degradation product has been dissolved in cold water while being stirred, was served as Comparative Example.

Experimental Example 1

(1) Production of Gel Compositions by Freezing and Heating

The galactose-partial degradation product produced in Production Example 1 was added into 200 mL tall beakers, followed by adding water at room temperature (25° C.) thereto, to disperse by lightly crumbling with spatula (spatel). Thus, 100 g of the dispersion liquids were prepared with the galactose-partial degradation product contents of 0.05 mass % (Example 1), 0.1 mass % (Example 2), 1 mass % (Example 3), 3 mass % (Example 4), 5 mass % (Example 5), 10 mass % (Example 6), 15 mass % (Example 7), and 20 mass % (Example 8), respectively. After the preparation of the dispersion liquids, each 20 g of the prepared dispersion liquid was dispensed into each of four screw cap glass vials [No. 35; content: 30 mL, manufactured by Maruemu Corporation], and the rest was dispensed into the fifth screw cap glass vial. The amount of each of the dispersion liquids remained and adhered to the tall beaker after the dispensing (C) was calculated by measuring the mass of the tall beaker after the dispensing (A), and deducting the mass of the tall beaker itself (B) (tare), which was measured in advance, from the mass (A) (C=A-B). The ratio of the amount of the dispersion liquid (C) based on 100 g of the dispersion liquid before dispensing was calculated by the expression: (C/100)×100. This calculation result was served as the sample loss rate (%) of the dispersion liquid. Further, each of the dispensed dispersion liquids was allowed to stand still for 2 hours in a freezer [manufactured by HOSHIZAKI ELECTRIC CO., LTD., model: HRF-180XF] set at −20° C. to lower its temperature to −20° C., then left for 2 hours in this state, and then thawed at room temperature. Thereafter, each of the dispersion liquids was allowed to stand still in a warm bath to have its temperature raised to 40° C., and then left for 2 hours in this state to thereby produce a gel composition.

(2) Production of Gel Compositions by Stirring and Dissolving in Cold Water, and Heating The galactose-partial degradation product produced in Production Example 1 was dispersed and dissolved in water added into a 200 mL tall beaker, while being forcibly stirred under ice cooling by a stirrer [product name: Three-One Motor] with a propeller stirring blade attached thereto. Thus, 100 g of aqueous solutions were prepared with the galactose-partial degradation product contents of 0.05 mass % (Comparative Example 1), 0.1 mass % (Comparative Example 2), 1 mass % (Comparative Example 3), 3 mass % (Comparative Example 4), 5 mass % (Comparative Example 5), 10 mass % (Comparative Example 6), 15 mass % (Comparative Example 7), and 20 mass % (Comparative Example 8), respectively. The amount of each of the aqueous solutions remained and adhered to the stirrer (E) was calculated by measuring the mass of the tall beaker containing the aqueous solution (D) after the stirrer was taken out from the aqueous solution, and deducting the mass of the tall beaker itself (B) (tare), which was measured in advance, from the mass (D). Subsequently, each 20 g of the aqueous solution remained in the tall beaker after the stirrer was taken out was dispensed into each of four screw cap glass vials, and the rest was dispensed into the fifth screw cap glass vial. The amount of each of the aqueous solutions remained and adhered to the tall beaker after the dispensing (C') was calculated by deducting the mass of the tall beaker itself (B) (tare), which was measured in advance, from the mass of the tall beaker after the dispensing (A). The ratio of the total of the amount of the aqueous solution removed as a result of adhering to the stirrer (E) and the amount of the aqueous solution remained and adhered to the tall beaker after the dispensing (C') based on the original amount of 100 g was calculated by the expression: ((E+C')/100)×100). This calculation result was served as the sample loss rate (%) of the aqueous solution. Further, each of the dispensed aqueous solutions was allowed to stand still for 2 hours in a freezer [manufactured by HOSHIZAKI ELECTRIC CO., LTD., model: HRF-180XF] set at −20° C. to lower its temperature to −20° C., then left for 2 hours in this state, and then thawed at room temperature. Thereafter, each of the aqueous solutions was allowed to stand still in a warm bath to have its temperature raised to 40° C., and then left for 2 hours in this state to thereby produce a gel composition.

(3) Evaluation

Evaluations mentioned below were made. The results are shown in Table 1.

Gelled State (Gel)

The gelled states of the gel compositions dispensed in the screw cap glass vials were visually checked. Evaluation was made, upon inclination of the screw cap glass vial by 90 degrees, by representing as follows: "⊙" when deformation of the gel was not visually observed; "○" when the gel was not collapsed while deformation of the gel was observed; "Δ" when the gel was collapsed; and "x" when the gel was not formed. The results are shown in Table 1.

Entrainment of Air Bubbles in Gel Compositions (Bubble Entrainment in Gel)

In the dispensed gel compositions, evaluation was made by representing as follows: "⊙" when bubbles in the gel were not visually observed or a very small number of bubbles were visually observed; "○" when a small number of bubbles were visually observed; "Δ" when a large number of bubbles were visually observed; and "x" when a very large number of bubbles were visually observed. The results are shown in Table 1.

Easiness of Filling (Decantation)

Evaluation was made upon filling the screw cap glass vial with a dispersion liquid or a stirred and dissolved solution by representing as follows: "○" filling could be made by decantation; and "x" filling couldn't be made by decantation. The dispersion liquid or the stirred and dissolved solution which could not be decanted were filled using a spatel or the like. The results are shown in Table 1.

Presence of Water Separation on Gel

Water on each of the gel compositions evaluated as "⊙" and "○" in the aforementioned evaluation for the gelled state was transferred from the screw cap glass vial to the plastic cup whose mass was measured in advance to measure the mass thereof. The mass of water transferred to the plastic cup was calculated by deducting the mass of the plastic cup (tare) from the obtained total mass. Further, water remained and adhered to the inner wall of the screw cap glass vial was wiped off with the Kimwipes [product name: Wiper S-200; manufactured by Nippon Paper Crecia Co., Ltd.] whose mass was measured in advance to measure the mass thereof. The mass of the absorbed water was measured by deducting the mass of Kimwipes (tare) from the obtained mass. Then, the total of the mass of water transferred to the plastic cup and the mass of water absorbed by Kimwipes was calculated as the amount of separated water F (g), and the ratio (%) of the amount of separated water F based on the mass (20 g) of the dispersion liquid or the aqueous solution dispensed in the screw cap glass vial was calculated as the water separation ratio (%). Further, the mass of the gel composition was calculated by deducting the amount of the separated water F (g) from the mass of the dispensed dispersion liquid or aqueous solution (20 g) (mass G=20−F). The concentration of the galactose-partial degradation product of this gel composition was calculated, based on the mass (20 g) of the dispersion liquid or the aqueous solution containing the galactose-partial degradation product with the concentration H before removing the separated water, by the expression: (20/(20−F)×H). The obtained value was served as the concentration of the produced gel (mass %). Further, the concentration rate (magnification) was calculated by dividing the obtained concentration of the produced gel by the concentration I (mass %) of the dispersion liquid or the aqueous solution before removing the separated water (concentration rate=(concentration of the produced gel)/I). The results are shown in Table 1. The amount of separated water in the gel composition evaluated as "Δ" in the above evaluation on the gelled state could not be measured because the content collapsed when the screw cup glass vial containing it was tilted. Since the water separation was not found in the gel composition (Examples 5 to 8, Comparative Examples 5 to 8), in which the concentration of the galactose-partial degradation product was 5 mass % or more, the concentration after dispensing the produced gel composition was the same as that of the dispersion liquid or the aqueous solution before removing the separated water. That is, the concentration rate was 1 time.

As shown in Table 1, it was found that the gel composition obtained from the dispersion liquids including 0.05 to 20 mass % of the galactose-partial degradation product based on the total mass of the composition (Examples 1 to 8) exhibits good gel formation. When comparing the composition obtained from the aqueous solutions (stirred and dissolved solutions) containing less than 1 mass % of the galactose-partial degradation product (Comparative Examples 1 and 2) with the composition obtained from the dispersion liquids with the same concentration (Examples 1 and 2), water separation did not occur in the aqueous solution (Comparative Examples). It was found from this that the galactose-partial degradation product was not concentrated in the aqueous solution (Comparative Examples), and thus the gel formation was not confirmed. On the other hand, a water layer was separated on the upper side of the dispersion liquid (Examples), and thereby the galactose-partial degradation product was concentrated therebelow, which resulted in good gel formation. When comparing the composition obtained from the aqueous solutions (stirred and dissolved solutions) containing 1 mass % of the galactose-partial degradation product (Comparative Example 3) with the composition obtained from the dispersion liquids with the same concentration (Example 3), water separation did not occur in the aqueous solution (Comparative Examples). It was found from this that the galactose-partial degradation product was not sufficiently concentrated in the aqueous solutions (Comparative Example), and thus only a weak gel having a low strength was produced. On the other hand, a water layer was separated on the upper side of the dispersion liquid (Example), and thereby the galactose-partial degradation product was concentrated therebelow, which resulted in producing a good gel having a high strength.

As to the bubble entrainment in the gel, it was found that the compositions (Examples 3 to 5) obtained from the dispersion liquids including 0.05 to 5 mass % of the galactose-partial degradation product therewith had smaller bubbles entrained therein and better appearance than the gels obtained from the aqueous solutions with the same concentration (stirred and dissolved solutions, Comparative Examples 3 to 5).

The dispersion liquid (Examples) could be filled in the screw cap vial by decantation until it reaches 10 mass %, while the aqueous solution (Comparative Examples) could not be filled therein any more by decantation when it reaches 5 mass % or more, since the aqueous solution had excessively high viscosity.

The total sample loss rate (loss, sample loss rate due to the adhesion to the container) when having filled the dispersion liquid was much smaller than the total sample loss rate (loss, sample loss rate due to the adhesion to the container and the stirrer) when having filled the aqueous solution.

Even if water separation occurs on the upper side of the gel in the dispersion liquid, such water separation can be suppressed or adjusted using a shallow container enabling a small depth of the dispersion liquid, when heating. Specifically, it is possible to adjust the concentration of the produced gel of the gel composition not only by changing the original amount of the galactose-partial degradation product to be added (concentration) but also by, for example, changing the depth of the dispersion liquid.

Compositions (Comparative Examples 9 and 10) were produced in the same manner as the aforementioned Examples using galactoxyloglucan [manufactured by DSP GOKYO FOOD & CHEMICAL Co., Ltd., GLYLOID (registered trademark)] in which a galactose moiety is not removed, the obtained dispersion liquid became viscous body containing large amounts of undissolved lumps and was not gelled even by heating.

TABLE 1

| | Amount added (mass %) | Cooling temperature (° C.) | Gelled state | Bubble entrainment in gel | Sample loss rate (%) | Decantation | Presence or absence of Water separation on gel |
|---|---|---|---|---|---|---|---|
| Ex. 1 | 0.05 | −20 | Δ | ◎ | 0.1 | ○ | presence |
| Com. Ex. 1 | 0.05 | — | X | — | 0.02 | ○ | — |
| Ex. 2 | 0.1 | −20 | ◎ | ◎ | 0.1 | ○ | presence |
| Com. Ex. 2 | 0.1 | — | X | — | 0.1 | ○ | — |
| Ex. 3 | 1 | −20 | ◎ | ◎ | 0.3 | ○ | presence |
| Com. Ex. 3 | 1 | — | Δ | Δ | 2.7 | ○ | absence |
| Ex. 4 | 3 | −20 | ◎ | ◎ | 0.6 | ○ | presence |
| Com. Ex. 4 | 3 | — | ◎ | X | 7.4 | ○ | absence |
| Ex. 5 | 5 | −20 | ◎ | ◎ | 1.1 | ○ | absence |
| Com. Ex. 5 | 5 | — | ◎ | X | 17.1 | X | absence |
| Ex. 6 | 10 | −20 | ◎ | ○ | 3.7 | ○ | absence |
| Com. Ex. 6 | 10 | — | ◎ | X | 8.9 | X | absence |
| Ex. 7 | 15 | −20 | ◎ | Δ | 1.6 | X | absence |
| Com. Ex. 7 | 15 | — | ◎ | X | 6.8 | X | absence |
| Ex. 8 | 20 | −20 | ◎ | Δ | 0.5 | X | absence |
| Com. Ex. 8 | 20 | — | ◎ | X | 2.8 | X | absence |
| Com. Ex. 9 | 3 | −20 | X | — | — | — | — |
| Com. Ex. 10 | 5 | −20 | X | — | — | — | — |

TABLE 1-continued

|  | Amount of separated water (g) | Amount of separated water (%) | Concentration of produced gel (mass %) | Concentration rate (magnification) |
|---|---|---|---|---|
| Ex. 1 | unmeasurable | — | — | — |
| Com. Ex. 1 | — | — | — | — |
| Ex. 2 | 18.4 | 92 | 1.3 | 13 |
| Com. Ex. 2 | — | — | — | — |
| Ex. 3 | 11.5 | 57 | 2.4 | 2.4 |
| Com. Ex. 3 | 0 | 0 | 1 | 1 |
| Ex. 4 | 3.3 | 16 | 3.6 | 1.2 |
| Com. Ex. 4 | 0 | 0 | 3 | 1 |
| Ex. 5 | 0 | 0 | 5 | 1 |
| Com. Ex. 5 | 0 | 0 | 5 | 1 |
| Ex. 6 | 0 | 0 | 10 | 1 |
| Com. Ex. 6 | 0 | 0 | 10 | 1 |
| Ex. 7 | 0 | 0 | 15 | 1 |
| Com. Ex. 7 | 0 | 0 | 15 | 1 |
| Ex. 8 | 0 | 0 | 20 | 1 |
| Com. Ex. 8 | 0 | 0 | 20 | 1 |
| Com. Ex. 9 | — | — | — | — |
| Com. Ex. 10 | — | — | — | — |

(Experimental Example 2) Cooling Temperature and Gel Formation of Dispersion Liquid of Galactose-Partial Degradation Product 0.6 g (3 mass %) and 1.0 g (5 mass %) of the galactose-partial degradation product produced in Production Example 1 were added into screw cap glass vials, followed by adding water at room temperature thereto, to obtain a total amount of 20 g of each of dispersion liquids of the galactose-partial degradation product. Each of the dispersion liquids was cooled at 12° C. (Examples 9 and 10), 11° C. (Examples 11 and 12), 10° C. (Examples 13 and 14), 8° C. (Examples 15 and 16), 6° C. (Examples 17 and 18), 4° C. (Examples 19 and 20), 3° C. (Examples 21 and 22), 2° C. (Examples 23 and 24), 1° C. (Examples 25 and 26), 0° C. (Examples 27 and 28), −5° C. (Examples 29 and 30), −10° C. (Examples 31 and 32), −15° C. (Examples 33 and 34), and −20° C. (Examples 35 and 36) using a thermostatic device [manufactured by ESPEC CORP., model type: PR-2KP], and left in this state for 2 hours to produce a hydrated swollen solution (dispersion liquid). Each sample after cooling was checked whether the dispersion liquid was frozen or not by visual observation and touching with spatel. The frozen dispersion liquid was left standing at room temperature to be thawed. The dispensed composition was raised to a temperature of 40° C. after the thawing, and left in this state for 2 hours, and thereafter the degree of gelation, the water separation on the upper side of the gel, and the bubble entrainment in the gel were observed by the aforementioned method. The results are shown in Table 2 and Table 3.

As shown in Tables 2 and 3, when the dispersion liquid was cooled at a temperature of 12° C. (Examples 9 and 10), gelation was not confirmed in both of the samples of 3 mass % and 5 mass %. When cooled at 11° C. (Examples 11 and 12), gelation was confirmed in the sample of 5 mass %. When cooled or frozen at 10° C. or lower and −20° C. or higher (Examples 13 to 36), gelation was confirmed in any samples of 3 mass % and 5 mass %. When cooling or freezing at 10° C. or less and −20° C. or more (Examples 13 to 36), gelation was confirmed in both of the samples of 3 mass % and 5 mass %. When cooled or frozen at 10° C. or lower and −20° C. or higher, water separation was observed on the upper side of the sample of 3 mass % after heating. Further, it was found that whether the dispersion liquid was frozen or not does not influence on the gelation performance. The amount of separated water observed on the upper side of the gel was constant regardless of the cooling temperature.

TABLE 2

|  | Additive amount (mass %) | Cooling temperature (° C.) | Freezing | Gel | Bubble entrainment in gel |
|---|---|---|---|---|---|
| Ex. 9 | 3 | 12 | Not frozen | X | — |
| Ex. 10 | 5 | 12 | Not frozen | X | — |
| Ex. 11 | 3 | 11 | Not frozen | X | — |
| Ex. 12 | 5 | 11 | Not frozen | Δ | — |
| Ex. 13 | 3 | 10 | Not frozen | Δ | ◎ |
| Ex. 14 | 5 | 10 | Not frozen | Δ | ◎ |
| Ex. 15 | 3 | 8 | Not frozen | Δ | ◎ |
| Ex. 16 | 5 | 8 | Not frozen | ○ | ◎ |
| Ex. 17 | 3 | 6 | Not frozen | ○ | ◎ |
| Ex. 18 | 5 | 6 | Not frozen | ◎ | ◎ |
| Ex. 19 | 3 | 4 | Not frozen | ◎ | ◎ |
| Ex. 20 | 5 | 4 | Not frozen | ◎ | ◎ |
| Ex. 21 | 3 | 3 | Not frozen | ◎ | ◎ |
| Ex. 22 | 5 | 3 | Not frozen | ◎ | ◎ |

TABLE 3

|  | Additive amount (mass %) | Cooling temperature (° C.) | Whether Frozen or not | Gel | Bubble entrainment in gel |
|---|---|---|---|---|---|
| Ex. 23 | 3 | 2 | Not frozen | ◎ | ◎ |
| Ex. 24 | 5 | 2 | Not frozen | ◎ | ◎ |
| Ex. 25 | 3 | 1 | Not frozen | ◎ | ◎ |
| Ex. 26 | 5 | 1 | Not frozen | ◎ | ◎ |
| Ex. 27 | 3 | 0 | Not frozen | ◎ | ◎ |
| Ex. 28 | 5 | 0 | Not frozen | ◎ | ◎ |
| Ex. 29 | 3 | −5 | Not frozen | ◎ | ◎ |
| Ex. 30 | 5 | −5 | Not frozen | ◎ | ◎ |
| Ex. 31 | 3 | −10 | Partly frozen | ◎ | ◎ |
| Ex. 32 | 5 | −10 | Not frozen | ◎ | ◎ |
| Ex. 33 | 3 | −15 | Frozen | ◎ | ◎ |
| Ex. 34 | 5 | −15 | Frozen | ◎ | ◎ |
| Ex. 35 | 3 | −20 | Frozen | ◎ | ◎ |
| Ex. 36 | 5 | −20 | Frozen | ◎ | ◎ |

(Experimental Example 3) Heat Resistance of Gel 1.5 g (3 mass %) and 2.5 g (5 mass %) of the galactose-partial degradation product produced in Production Example 1 were added into snap cap glass vials [No. 50; content: 60 mL, manufactured by Maruemu Corporation], followed by adding water at room temperature thereto, to obtain a total amount of 50 g of each of dispersion liquids of the galactose-partial degradation product. Each of the dispersion liquids was allowed to stand still for 2 hours in a freezer [manufactured by HOSHIZAKI ELECTRIC CO., LTD., model: HRF-180XF] set at −20° C. to have its temperature lowered to −20° C., then left for 2 hours in this state, and then thawed at room temperature, allowed to have the temperature raised to 40° C. in a warm bath, and then left for 2 hours in this state to thereby produce a composition. Thereafter, the snap cap glass vials were covered from above with aluminum foil, placed on a stainless tray, and allowed to stand still for 1 hour in the oven [model type: WFO-450ND; manufactured by Tokyo Rikakikai Co., Ltd.] set at 110° C. After the standing still, the vials were taken out and tilted by 90 degrees. Visual observation for the strength of the gel revealed that none of the gels collapsed. On the other hand, water was added into snap cap glass vials, while being forcibly stirred under ice cooling by a stirrer [product name: Three-One Motor] with a propeller stirring blade attached thereto, and 1.5 g (3 mass %) and 2.5 g (5 mass %) of the galactose-partial degradation product produced in Production Example 1 were added thereto to be dispersed or dissolved, to obtain a total amount of 50 g of each of aqueous solutions of the galactose-partial degradation product. Each of the aqueous solution was allowed to have its temperature lowered to −20° C., and then allowed to have its temperature raised to 40° C., and left in this state, to thereby produce a gel composition in the same manner as mentioned above. Thereafter, visual observation for the strength of the gel was performed in the same manner as the above, which revealed that when this dispersion liquid was heated, expansion of bubbles are caused, which resulted in large deformation in the gel and hence caused the gel to have its shape collapsed (broken into pieces separated from each other), because the aqueous solution included a considerable number of bubbles.

(Experimental Example 4) Water Resistance of Gel 1.0 g (5 mass %) of the galactose-partial degradation product produced in Production Example 1 was added into a plastic cup [EI-90, product name: PROMAX, content: 90 mL, manufactured by ASAHIKASEI PAX CORPORATION], followed by adding water at room temperature thereto, to obtain a total amount of 20 g of a dispersion liquid of the galactose-partial degradation product. The dispersion liquid was allowed to stand still for 2 hours in a freezer [manufactured by HOSHIZAKI ELECTRIC CO., LTD., model: HRF-180XF] set at −20° C. to have its temperature lowered to −20° C., then left for 2 hours in this state, then thawed at room temperature, then heated in a warm bath to have its temperature raised to 40° C., and left for 2 hours in this state. Thereby, the composition was produced. Thereafter, three gel compositions (gel compositions produced in the same manner using three plastic cups) were taken out from the plastic cups and introduced into a 500 mL glass beaker with about 300 mL of water contained therein, followed by further adding water thereto to have a total amount of about 400 mL. On the other hand, three gel compositions (gel compositions produced in the same manner using three plastic cups) were taken out from the plastic cups, placed on stainless trays, and covered with wraps to be served as controls. Gels in water and gels on the stainless trays were allowed to stand still in an incubator set at a temperature of 25° C. for 24 hours. After the standing still for 24 hours, the gels were taken out, visual observation was performed on the shape of the gel, which revealed that the gels in water did not collapse.

(Experimental Example 5) Stability of Gel 1.0 g and 2.0 g of the galactose-partial degradation product were added into glass vials, followed by adding 0.6 g of HYDROLITE-5 [manufactured by Symrise AG] as preservative thereto, and then adding water at room temperature thereto, to prepare a total amount of 20 g of each of dispersion liquids respectively including 5 mass % and 10 mass % of the galactose-partial degradation product. Each of the dispersion liquids was allowed to have its temperature lowered and raised in the same manner as the above to produce a composition. The obtained compositions were left for 3 months at temperatures of 4° C., 25° C., and 40° C. to observe water separation. The results are shown in Table 4. The evaluation on whether water was separated or not was made according to the following evaluation criteria.

Separated: Partial water separation can be observed.
Not separated: Almost no water separation can be observed.

As shown in Table 4, it was revealed that water separation did not occur when stored at the temperature of 4° C. and 25° C. until the lapse of 90 days in any compositions obtained using the dispersion liquids with 5 mass % and 10 mass % of the galactose-partial degradation product. It was also revealed that, when stored at 40° C., significant water separation did not occur until the lapse of 14 days in the dispersion liquid with 10 mass % of the galactose-partial degradation product, and until the lapse of 60 days in the dispersion liquid with 5 mass % of the galactose-partial degradation product.

TABLE 4

| Storage period | Amount added | Presence or absence of water separation in each storage temperature | | |
|---|---|---|---|---|
| (day) | (%) | 4° C. | 25° C. | 40° C. |
| 7 | 5 | absence | absence | absence |
|  | 10 | absence | absence | absence |
| 14 | 5 | absence | absence | absence |
|  | 10 | absence | absence | absence |
| 30 | 5 | absence | absence | absence |
|  | 10 | absence | absence | presence |
| 60 | 5 | absence | absence | absence |
|  | 10 | absence | absence | presence |
| 90 | 5 | absence | absence | presence |
|  | 10 | absence | absence | presence |

(Test Example 1) Viscosity Change of Galactoxyloglucan and Galactose-Partial Degradation Product Water at 25° C. was added to galactoxyloglucan [manufactured by DSP GOKYO FOOD & CHEMICAL Co., Ltd., GLYLOID (registered trademark)], in which a galactose moiety is not removed, and the galactose-partial degradation product to allow them to disperse in water, to thereby obtain dispersion liquids including 1.5 mass % and 5 mass % of the respective components. Thereafter, increase in viscosity of each of the dispersion liquids was measured by a rapid visco analyser [model: RVA-4; manufactured by Newport Scientific Inc.] for 60 minutes. The increase in viscosity with time represents that dissolution is in progress. As shown in the FIGURE, the viscosity greatly increased immediately after the dispersion of galactoxyloglucan, while the viscosity did not change in the dispersion of the galactose-partial degradation product. It was found from the above results that the dispersion liquid including the galactose-partial degradation product is easier to handle than the dispersion liquid including galactoxyloglucan, in which a galactose moiety is not removed, since the galactose-partial degradation product hardly progresses from the hydrated and swollen state to the dissolution state after dispersion and hence does not increase in viscosity.

The invention claimed is:

1. A hydrated swollen product comprising 5 to 20 mass % of a partial degradation product of the galactose moiety of galactoxyloglucan in an aqueous solvent, wherein
the partial degradation product of the galactose moiety of galactoxyloglucan in powder form is undissolved in the aqueous solvent, while absorbing the aqueous solvent therein and being suspended in the aqueous solvent.

2. The hydrated swollen product according to claim 1, which is used for preparing a gel composition.

3. The hydrated swollen product according to claim 1, which is cooled to 15° C. or lower.

4. A production method for a gel composition, comprising steps (1) to (3) mentioned below:
step (1) of mixing at 18 to 30° C. a partial degradation product of the galactose moiety of galactoxyloglucan in powder form and an aqueous solvent to obtain a mixture;
step (2) of cooling or freezing the mixture obtained in step (1) to produce the hydrated swollen product according to claim 1; and
step (3) of gelling the hydrated swollen product obtained in step (2) by heating to obtain a gel composition that comprises the galactose-partial degradation product.

5. The production method for the gel composition according to claim 4, wherein, in step (2), the mixture obtained in step (1) is cooled or frozen to −25 to 10° C.

6. The production method for the gel composition according to claim 4, wherein the aqueous solvent is water or salt aqueous solution.

* * * * *